United States Patent
Nakao et al.

(10) Patent No.: US 8,260,114 B2
(45) Date of Patent: Sep. 4, 2012

(54) VIDEO RECORDING AND PLAYBACK EQUIPMENT, VIDEO RECORDING METHOD, VIDEO PLAYBACK METHOD, AND VIDEO RECORDING AND PLAYBACK METHOD

(75) Inventors: Akihiko Nakao, Kanagawa-ken (JP); Kenshi Dachiku, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 626 days.

(21) Appl. No.: 12/424,011

(22) Filed: Apr. 15, 2009

(65) Prior Publication Data
US 2009/0304352 A1 Dec. 10, 2009

(30) Foreign Application Priority Data
Jun. 5, 2008 (JP) ................. 2008-148333

(51) Int. Cl.
*H04N 5/80* (2006.01)
(52) U.S. Cl. ........................ 386/248; 386/355
(58) Field of Classification Search .................. 386/248, 386/355
See application file for complete search history.

(56) References Cited

U.S. PATENT DOCUMENTS

| | | | |
|---|---|---|---|
| 6,252,947 B1 | 6/2001 | Diamond et al. | |
| 2004/0179435 A1 | 9/2004 | Kato | |
| 2007/0067468 A1 | 3/2007 | Hyodo et al. | |
| 2010/0278511 A1* | 11/2010 | Hyodo et al. | 386/239 |

FOREIGN PATENT DOCUMENTS

| | | |
|---|---|---|
| CN | 1826655 A | 8/2006 |
| EP | 1 830 575 A2 | 9/2007 |
| EP | 1 876 818 A1 | 1/2008 |
| EP | 2 012 322 A1 | 1/2009 |
| JP | 2003-339018 | 11/2003 |
| JP | 2004-201266 | 7/2004 |
| JP | 2006-80870 | 3/2006 |
| JP | 2006-333330 | 12/2006 |
| JP | 2007-265467 | 10/2007 |
| WO | WO 03/088658 A2 | 10/2003 |
| WO | WO 2004112029 A1 * | 12/2004 |

OTHER PUBLICATIONS

Chinese Office Action issed on May 25, 2011 in corresponding Chinese Application No. 200910146019.6 (with an English Translation).
Office Action issued Sep. 7, 2010, in Korea Patent Application No. 10-2009-0037140 (with English-language Translation).
Office Action issued May 27, 2011 in Canadian Patent Application No. 6,665,932.

* cited by examiner

*Primary Examiner* — Thai Tran
*Assistant Examiner* — Girumsew Wendmagegn
(74) *Attorney, Agent, or Firm* — Oblon, Spivak, McClelland, Maier & Neustadt, L.L.P.

(57) ABSTRACT

A video recording and playback equipment which plays video data of a program memorized in an MXF file without playback delay is provided. It has a receiver, an analyzer, a playback information table, a program data memory and a decoder. The receiver receives the MXF file which includes the video data and metadata including information about an identification tag to identify the video data and data size of the video data. The analyzer judges whether the data contained in the file is the video data. If it is the video data, the analyzer analyzes a memory location where the video data is memorized in the file and memorize it on the playback information table as playback information, and also memorize the file to the program data memory. Only the video data is played by the decoder from the file based on the playback information.

13 Claims, 7 Drawing Sheets

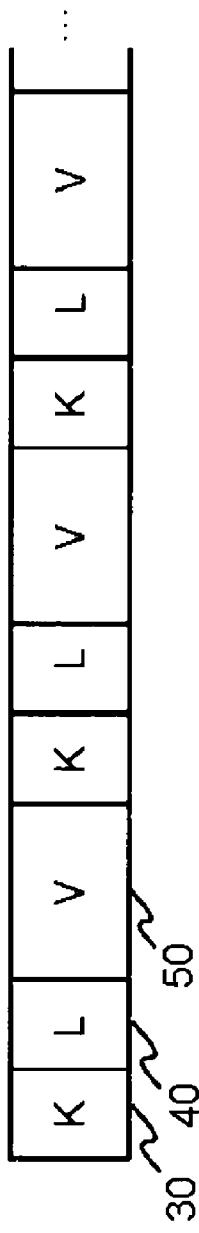
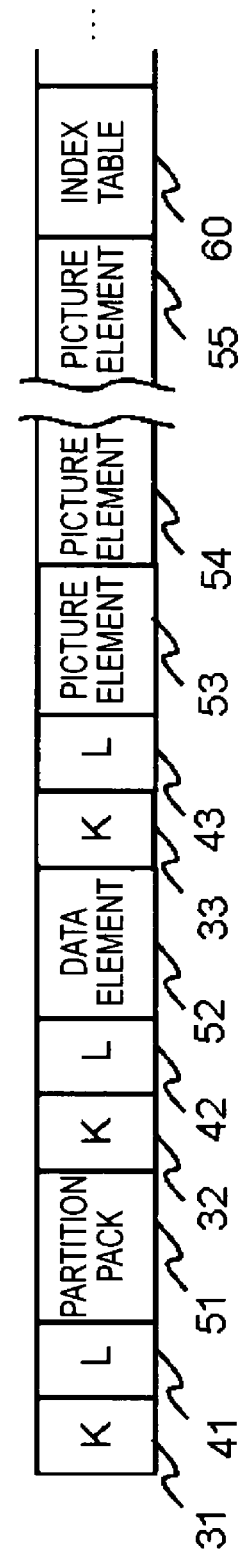
FIG. 2A
FIG. 2B

| PROGRAM DATA FILE | HEAD POSITION OF VIDEO DATA | SIZE |
|---|---|---|
| FILE_A | 0.3MB | 1MB |
| | 1.8MB | 1MB |
| | 3.0MB | 0.5MB |
| | ⋮ | ⋮ |

VIDEO RECORDING AND PLAYBACK EQUIPMENT, VIDEO RECORDING METHOD, VIDEO PLAYBACK METHOD, AND VIDEO RECORDING AND PLAYBACK METHOD

CROSS REFERENCE TO RELATED APPLICATION

This application is based upon and claims the benefit of priority from the prior Japanese Patent Application No. 2008-148333, filed on Jun. 5, 2008, the entire materials of which are incorporated herein by reference.

FIELD OF THE INVENTION

The present invention relates to a video recording and playback equipment in which records and plays video data in a MXF (Material exchange Format) standard via a network, and relates to a video recording method, a video playback method and a video recording and playback method.

DESCRIPTION OF THE BACKGROUND

While progress of terrestrial digital broadcasting and progress of fusion of communications and broadcast, digitalization in a broadcast field is progressing increasingly. Conventionally, program materials were recorded on package media, such as a video tape. Program materials are taken into a server via various digital interfaces, such as SDI (Serial Digital Interface) and transmitted to other servers, an editing device, etc. Since video data of the program materials once taken on the server is treated as a file, the video data is transmitted between the servers connected by the network, or is shared. For this reason, compatibility of data files needs to be strictly guaranteed between the devices which constitute a program production system.

Since standards of package media were decided strictly conventionally, as for the program materials recorded on the package media, mutual compatibility was guaranteed clearly physically. However, in the program material taken into devices as a file, a format is regarded as attachment of logical meaning and becomes independent of a physical format. Various formats exist not having compatibility with other formats from such a background.

In order to resolve complication caused by such mixture of formats, the MXF standard was established by SMPTE (Society of Motion Picture and Television Engineers) aiming at a unified file exchange format of broadcast industry. The MXF is like "a container" or "a wrapping paper" for packing coded various video data and voice data with metadata. By using this MXF, file exchange of the video data of the program materials through the network can be easily performed.

An art for performing file exchange using the MXF and playing the video data of the program included in the MXF is known (JP, P2006-139334A).

The file of MXF contains data other than the video data of the program material called metadata, such as an identification tag which identifies the data, an index data, etc. For this reason, when playing the video data of the program material, there is no video data during the time when the metadata is sent to a decoder. Therefore, in conventional technology, there is a problem that playback delay occurs by blank time of playback until following video data is sent.

SUMMARY OF THE INVENTION

An object of the present invention is to provide a video recording and playback equipment, a video recording method, a video playback method, and a video recording and playback method which can play video data memorized in a file of MXF without playback delay.

A video recording and playback equipment according to a embodiment of the invention inputs from the outside and records a file of a predetermined file format containing video data and metadata accompanying said video data including information about at least an identification tag to identify said video data and data size of said video data, and plays said video data. The video recording and playback equipment includes a receiver, an analyzer, a playback information table, a program data memory and a decoder. The receiver is configured to receive the file from the outside. The analyzer is configured to analyze a memory location of the video data recorded in the file received by the receiver. The playback information table is configured to memorize the memory location analyzed by the analyzer as playback information. The program data memory is configured to memorize the file analyzed by the analyzer without changing the predetermined file format received by the receiver. The decoder is configured to judge the memory location of the video data with reference to the playback information, and to play the video data from the file memorized by the program data memory.

A video recording method according to the embodiment of the invention receives from the outside and records a file of a predetermined file format containing video data and metadata accompanying the video data including information about at least an identification tag to identify the video data and data size of side video data. The video recording method includes receiving the file from the outside, judging whether the data contained in the file is the video data, analyzing a memory location where the video data is recorded in the file when the data is judged to be the video data, memorizing analyzed the memory location on playback information table as playback information, and memorizing the file received without changing the predetermined file format.

A video playback method according to the embodiment of the invention plays video data from a file which records said video data and metadata accompanying the video data including information about at least an identification tag to identify the video data and data size of the video data by a decoder. The video playback method includes analyzing a memory location where the video data is recorded in the file, memorizing the memory location analyzed on a playback information table as playback information, and decoding only the video data contained in the file based on the playback information.

A video recording and playback method according to the invention receives from the outside and records a file containing a video data and metadata accompanying the video data including information a identification tag to identify the video data and data size of the video data, and plays the video data. The video recording and playback method includes receiving the file from the outside, judging whether the data contained in the file is said video data, analyzing a memory location where the video data is recorded in the file when the data is judged to be said video data, memorizing the memory location analyzed on a playback information table as playback information, memorizing the file received without changing the predetermined file format, and decoding only the video data contained in the file based on the playback information.

BRIEF DESCRIPTION OF THE DRAWINGS

FIG. 2A is a drawing showing a format of a file inputted into the video recording and playback equipment concerning embodiment 1.

FIG. 2B is a drawing showing a format of a file inputted into the video recording and playback equipment concerning embodiment 1.

FIG. 3 is a drawing showing a playback information table memorized by the video recording and playback equipment concerning embodiment 1.

DETAILED DESCRIPTION OF THE INVENTION

Hereinafter, an embodiment of the present invention will be explained with reference to the drawings.

[Embodiment 1]

Figure 1:
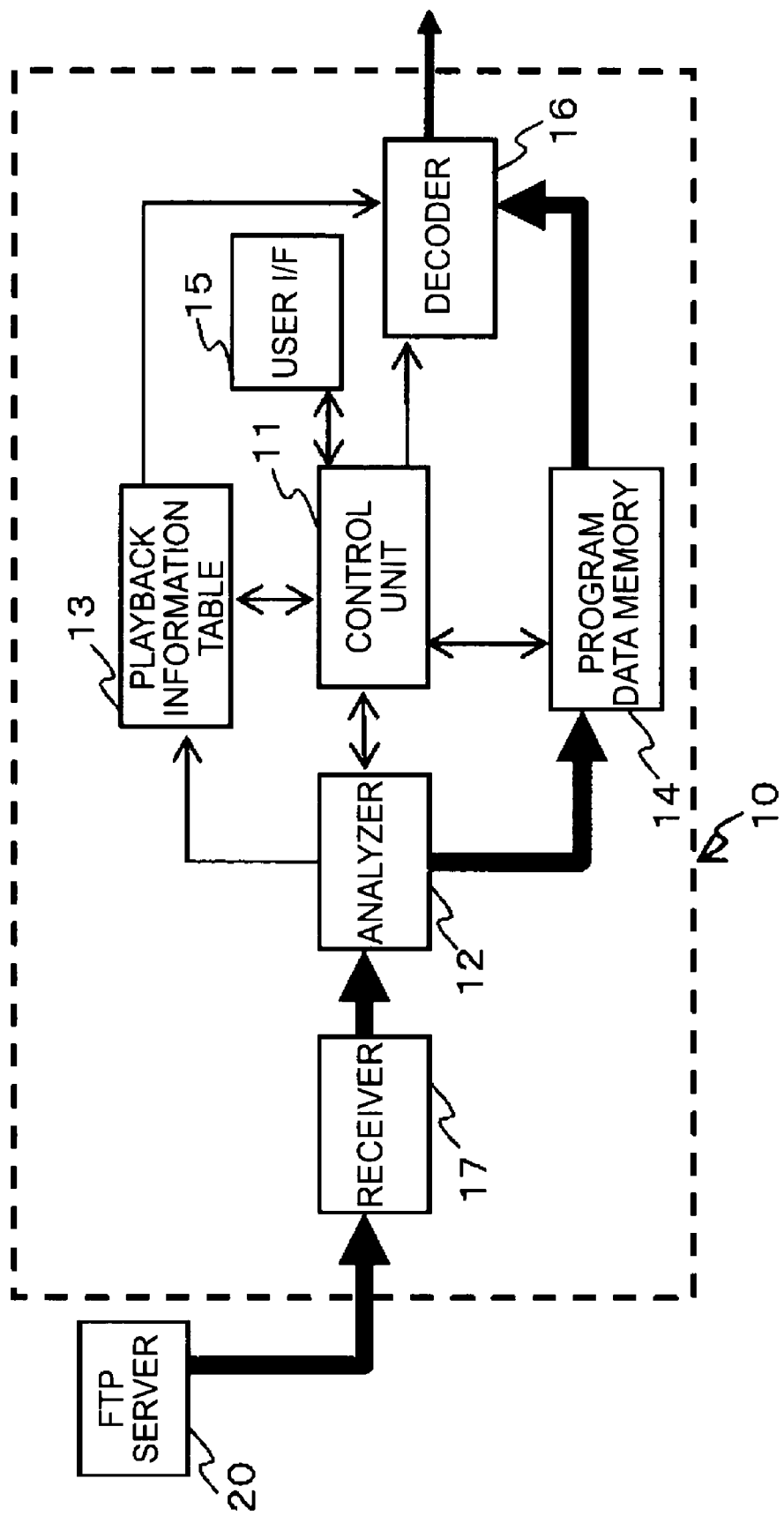
FIG. 1 is a block diagram showing composition of a video recording and playback equipment concerning an embodiment 1.

FIG. 1 is a block diagram showing an entire configuration of a video recording and playback equipment in according to the embodiment of the present invention. Video recording and playback equipment 10 is provided with control unit 11, analyzer 12, playback information table 13, program data memory 14, user interface 15, decoder 16 and receiver 17.

Program data is a file described in MXF in which data required in order to broadcast a program was stored, and the file includes video data and metadata accompanying the video data which metadata includes information about at least an identification tag which identifies the video data, a compression method of the video data, and data size of the video data, etc. In addition, the program data may contain not only the video data but voice data and title data.

Control unit 11 is connected with analyzer 12, playback information table 13, program data memory 14, user interface 15 and decoder 16, and control unit 11 controls them and video recording and playback equipment 10 whole.

Receiver 17 is a device which inputs the program data into video recording and playback equipment 10, and is connected with analyzer 12. Here, receiver 17 receives the program data of MXF containing the video data mentioned later.

Analyzer 12 analyzes the program data received by receiver 17, and distinguishes the video data and the metadata. And analyzer 12 analyzes a memory location where the video data is memorized from the metadata. Analyzer 12 relates the memory location with the identification information of the program data, and memorizes the memory location on playback information table 13 as playback information. Playback information table 13 is explained in details later. The memory location is expressed by a head position and a data size of each video data in the file of the program data, for example. Furthermore, analyzer 12 memorizes the program data of which analysis is ended to program data memory 14 with a state of received MXF.

Record of the playback information on playback information table 13 and the record of the program data on program data memory 14 may be directly recorded on playback information table 13 and program data memory 14 from analyzer 12, and may be recorded via an internal bus (not shown) of video recording and playback device 10. The program data of MXF is received from FTP server 20, the memory location is analyzed, the memory location is recorded on playback information table 13 as the playback information, and the program data is memorized on program data memory 14. These processes are hereinafter called "recording".

A command from a user is inputted into user interface 15. For example, the command which plays the program data memorized on program data memory 14 is inputted from user interface part 15. Then, control unit 11 orders playback information table 13 to transmit the playback information of the program data to be played to decoder 16, and orders program data memory 14 to transmit the program data to be played to decoder 16.

Playback information table 13 transmits the playback information of the program data to decoder 16, and program data memory 14 transmits the program data to decoder 16.

Decoder 16 receives the playback information and the program data, judges the memory location where the video data is memorized in the program data according to the playback information, and plays only the video data. Therefore, by referring to the playback information, when decoding the video data, the video data can be played without the playback delay.

Next, an example of the program data of MXF which contains the video data is explained with reference to FIGS. 2A and 2B. FIG. 2A shows a basic description format of MXF. In MXF, three descriptions, Key 30, Length 40 and Value 50, are repeated. This is called KLV coding method. In Key 30, the identification tag of the data is described. In Length 40, the information about the data sizes, such as data length etc. of the data of Value 50 which follows Length 40, is described. And the data itself to store in a MXF file goes into in Value 50. In FIG. 2A, Key 30 is written as "K", Length 40 is written as "L" and Value 50 is written as "V". Since the identification tag of the data is described in Key 30, it is judged by referring to Key 30 whether the data stored in Value 50 following Key 30 is a moving picture data or the voice data.

FIG. 2B shows the MXF file which stores the video data etc. in Value 50. In this example, Partition Pack 51, Data element 52, Picture element 53, 54 and 55, and Index Table 60 are stored in Value 50. Partition Pack 51 is used in order to divide a header, a body and a footer of the MXF file. Data element 52 is data which accompanies the video data. Picture element 53, 54 and 55 are the moving picture data of the video data. Index Table 60 is the data which shows a separator, etc. of a plurality of Picture element 53, 54 and 55 in order to specify the storing position of the data at high speed. A plurality of Picture element 53, 54 and 55 may be stored in Value 50 as illustrate.

Next, an example of playback information table 13 is explained with reference to FIG. 3. When video recording and playback equipment 10 records the program data, playback information table 13 memorizes the identification information of the program data file and memorizes the memory location where the video data of the program data is memorized as the playback information. The memory location is expressed by the head position and the data size of each video data in the file of the program data as mentioned above. Therefore, playback information table 13 records the head position and the data length of each of the video data as the playback information for every file of the program data. The head position of a portion where the video data is memorized can be distinguished by referring to Key 30 of the MXF file. And the data length of the video data can be distinguished by referring to Length 40.

Playback information table 13 shown in FIG. 3 shows the identification information of the program data file, and the head position and the size of each video data of the program data as the play information. The identification information is FILE_A. In a 1st video data, the head is located in the position of 0.3 MB from the beginning of the program data, and the size is 1 MB. In a 2nd video data, the head is located in the position of 1.8 MB from the beginning of the program data, and the size is 1 MB. In a 3rd video data, the head is located in the position of 3.0 MB from the beginning of the program data, and the size is 0.5 MB. In addition, about other program data, the playback information is described on playback information table 13 together with the identification information of the program data file.

The memory location of the video data can also be expressed by the head position and the end position of each video data, without being restricted to the above-mentioned example. Therefore, playback information table 13 may record the head position and the end position of each video data as the playback information. In this case, analyzer 12 analyzes that a starting position of Value 50 is the head position and a position where the data size which is described in Length 40 is passed is the end position.

Figure 4:
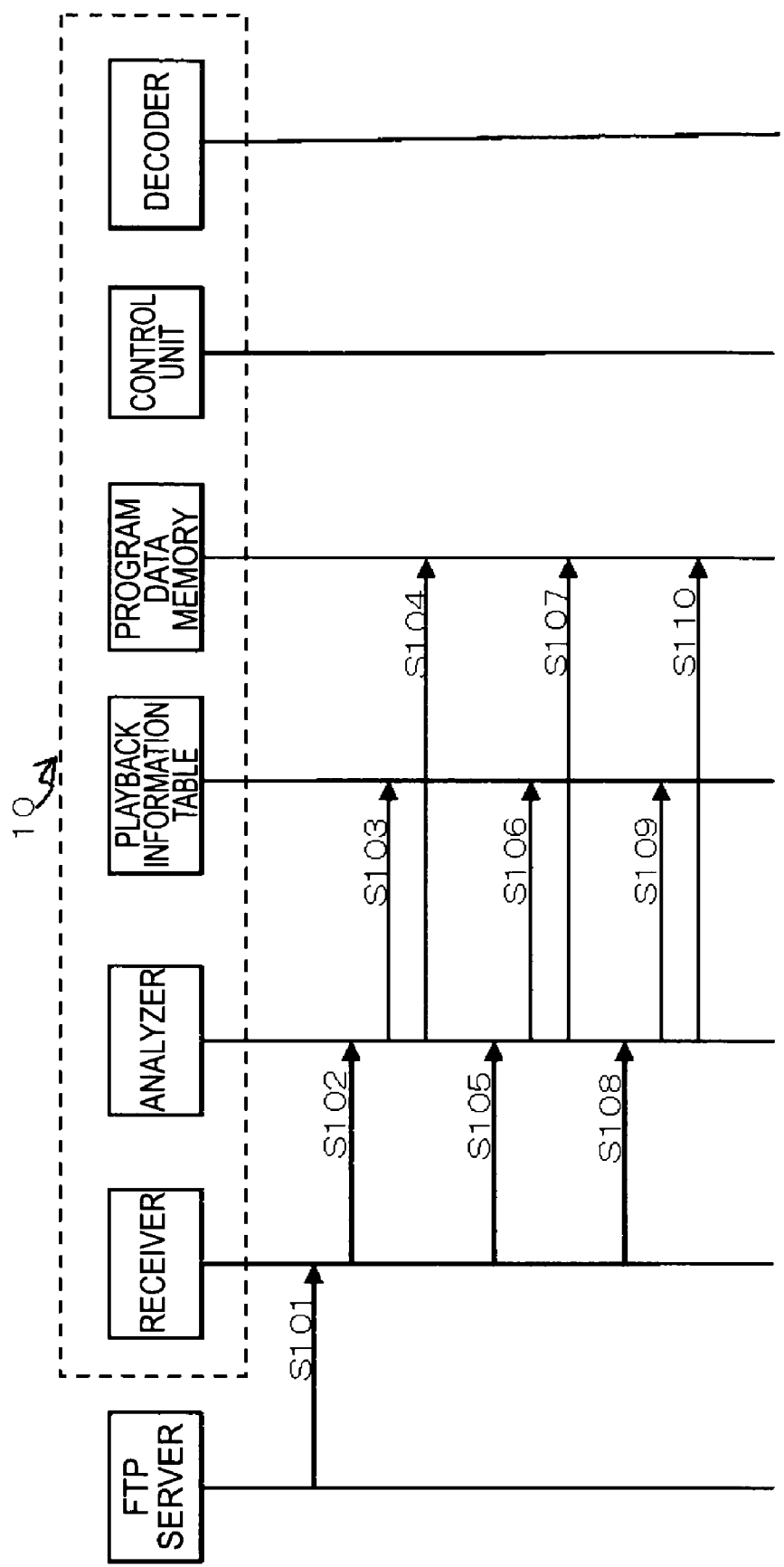
FIG. 4 is a sequence diagram showing processing in the case the video recording and playback equipment concerning embodiment 1 records a file.

Next, an example of processing in the case of recording the program data on video recording and playback equipment 10 is shown with reference to FIG. 4. Here, the program data of MXF from FTP server 20 is received and analyzed, and the playback information is memorized on playback information table 13, and the program data is memorized on program data memory 14.

First, the program data of MXF is transmitted to video recording and playback equipment 10 from FTP server 20 (S101). The whole program data is not transmitted at once, but program data is transmitted as a stream of data. However, in FIG. 4, one arrow S101 shows transmission of the program data.

If the program data is transmitted to video recording and playback equipment 10 from FTP server 20, receiver 17 will receive the data and transmit the data to analyzer 12 (S102). Analyzer 12 which received the data judges whether the data stored in Value 50 is the video data with reference to Key 30 in the data. When the data stored in Value 50 is the video data, analyzer 12 judges the data length of the video data with reference to Length 40. And analyzer 12 relates the head position and the data length of the video data as the playback information with the identification information of the program data, and memorizes them on playback information table 13 (S103). Analyzer 12 transmits the data of which analysis is ended to program data memory 14 with the state of MXF, and program data memory 14 memorizes the received data (S104).

An end of the analysis and memory of the data which was received will transmit the data which receiver 17 received while performing analysis and memory, to analyzer 12 from receiver 17 (S105). Analyzer 12 which received the data judges whether the data stored in Value 50 is the video data with reference to Key 30 of the program data. When the data stored in Value 50 is the video data, analyzer 12 judges the data length of the video data with reference to Length 40. And analyzer 12 relates the head position and the data length of the video data with the program data, and memorizes them on playback information table 13 as the playback information (S106). Analyzer 12 transmits the program data of which analysis is ended to program data memory 14 with the state of MXF, and memorize the program data to program data memory 14 (S107).

If program data memory 14 memorizes the data received from analyzer 12, analysis and record will be performed as like as the process from S105 to S107 about the data which receiver 17 received while performing analysis and memory. Hereinafter, the same process is repeated until the whole program data is received (S110). Such process is called recording.

Figure 5:
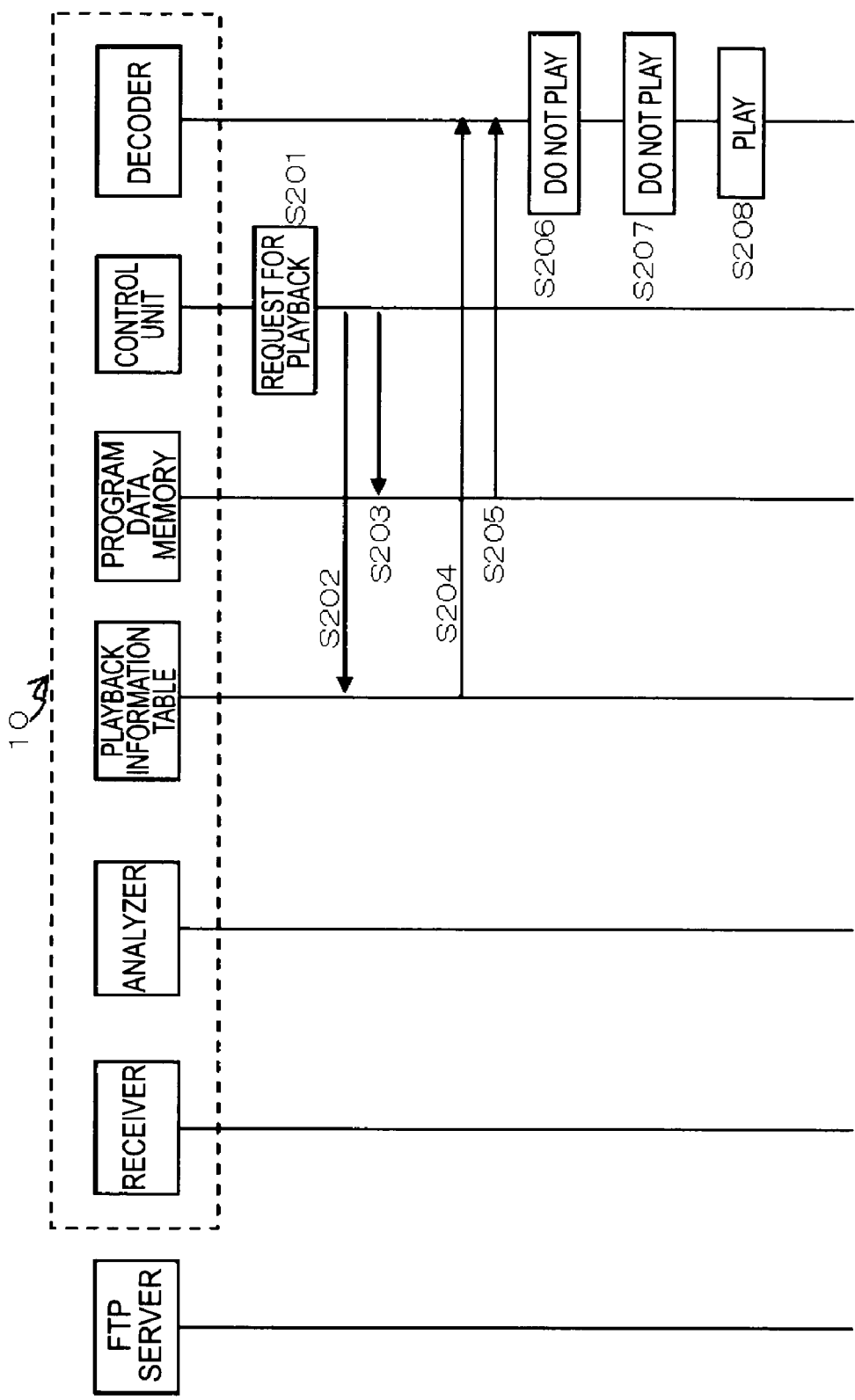
FIG. 5 is a sequence diagram showing processing in the case the video recording and playback equipment concerning embodiment 1 plays the video data contained in the file.

Next, an example of process in the case video recording and playback equipment 10 plays the program data with reference to FIG. 5 is explained.

First, the play request which is the command to play the program data is inputted from user interface 15 (S201). The play request includes specification of the program data. Control unit 11 orders playback information table 13 to transmit the playback information of the program data specified to decoder 16 (S202). And control unit 11 orders program data memory 14 to transmit the program data specified to decoder 16 (S203). Playback information table 13 transmits the playback information of the program data specified to decoder 16 (S204), and program data memory 14 transmits the program data specified to decoder 16 (S205). Decoder 16 judges the memory location of the video data with reference to the play information, judges that the portion on which the video data is not recorded in the program data is not played (S206, S207), judges that the portion on which the video data is recorded in the program data is played and decodes (S208). The judgment of "play" or "not play" of processes S206, S207, S208 etc. is repeated until all the video data of the program data is judged and decoded.

Thus, when the video recording and playback equipment according to the embodiment records the program data of MXF, it analyzes the video data and the metadata which are contained in the program data, and memorizes the analyzed position information on playback information table 13 as the playback information. And not only the program data but the playback information of the program data is transmitted to decoder 16 at the time of playback. In decoder 16, the video data can continuously be played without playback delay by judging the memory location of the video data based on the playback information and playing only the video data.

[Embodiment 2]

In embodiment 1, the program data and the playback information thereof are sent to decoder 16 at the time of playback. And decoder 16 judges the memory location where the video data is memorized with reference to the playback information, and decodes the video data of the program data. However, not decoder 16 but control unit 11 may judge the memory location where the video data is memorized.

So, in embodiment 2, control unit 11 judges the position where the video data is memorized.

Figure 6:
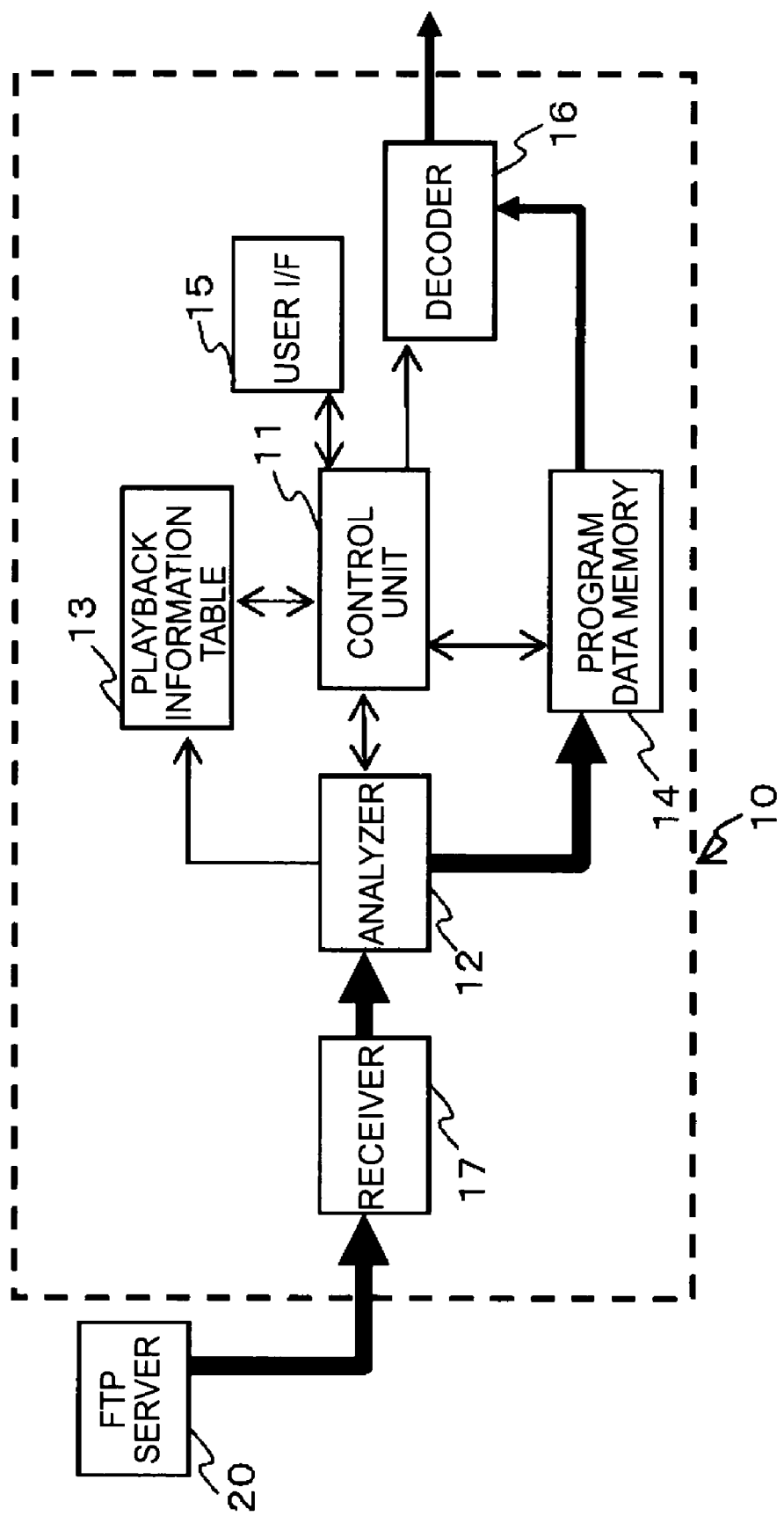
FIG. 6 is a block diagram showing composition of a video recording and playback equipment concerning embodiment 2.

FIG. 6 is a drawing showing the entire configuration of the video recording and playback equipment concerning embodiment 2. Since the composition of video recording and playback equipment 10 is the same as that of embodiment 1, same symbol is given to an identical part and an explanation is omitted. Furthermore, since MXF and playback information table 13 are the same as those of embodiment 1, same symbol is given to an identical part and an explanation is omitted.

Since embodiment 2 differs from embodiment 1 only when playing the data which flows in video recording and playback equipment 10, the data flow in the case of playing the video data is explained.

The play request which is the command to play the program data memorized on program data memory 14 is inputted from user interface 15. The play request includes specification of the program data. Control unit 11 judges the memory location where the video data is memorized in the program data with reference to the playback information corresponding to the specified program data memorized by playback information table 13. Control unit 11 orders the program data memory 14 to transmit only the portion of the video data of the program data to decoder 16 based on the memory location where the video data is memorized. Decoder 16 which received only the video data portion decodes the video data in the received order. The video recording and playback equipment by this embodiment can also acquire the same effect as embodiment 1 that the video data can be played continuously without playback delay.

Figure 7:
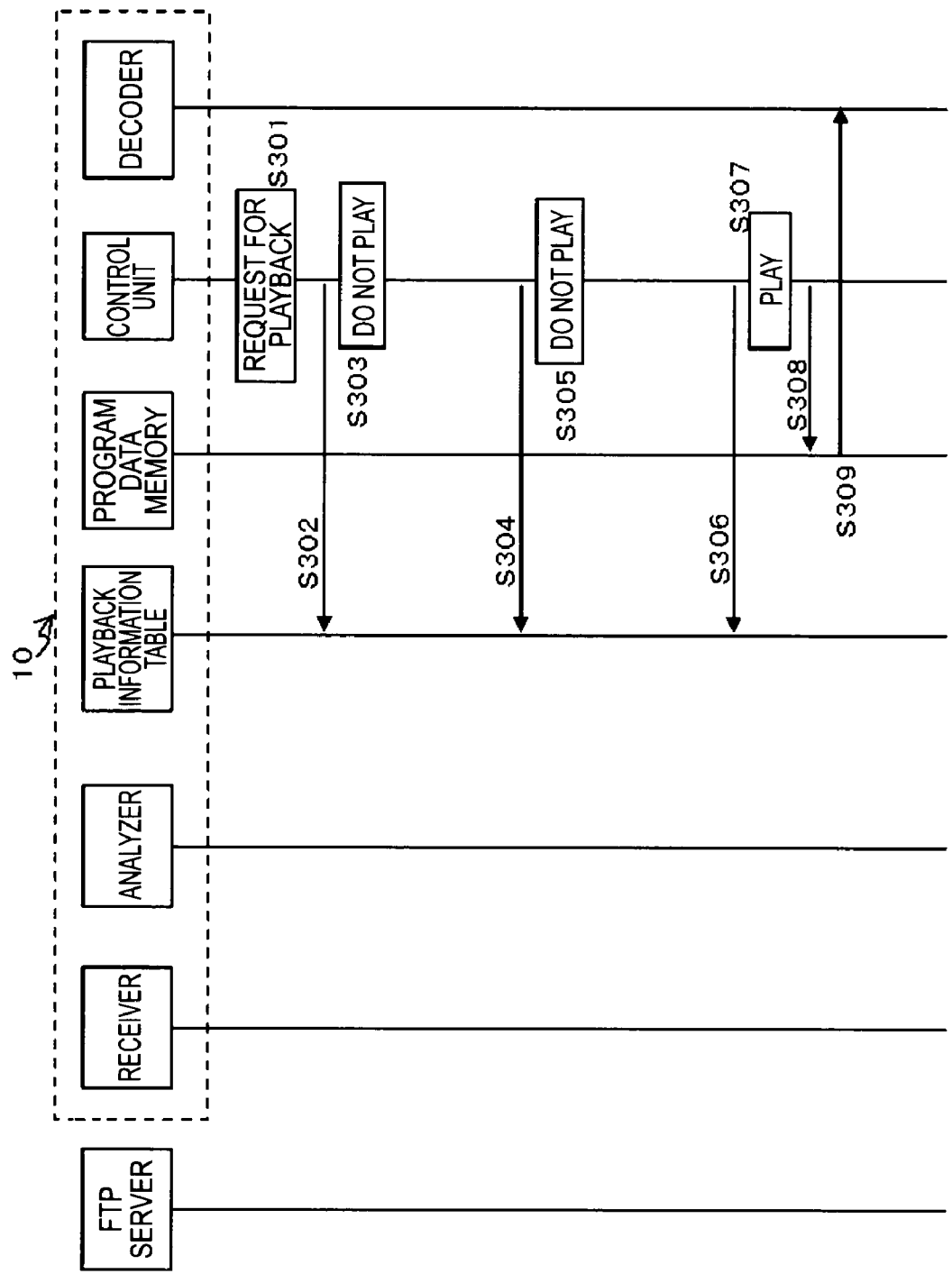
FIG. 7 is a sequence diagram showing processing in the case the video record playback equipment concerning embodiment 2 plays the video data contained in the file.

FIG. 7 shows an example of processing in the case video recording and playback equipment 10 shown in FIG. 6 plays the program data. First, the play request which is the command to play the program data is inputted from user interface 15 (S301). This play request includes specification of the program data. Control unit 11 refers to the playback information of the specified program data which is memorized by playback information table 13 (S302). Control unit 11 judges the memory location of the video data based on the playback information, and judges not to play the program data other than the position where the video data to be played is memorized, and control unit 11 does not make program data memory 14 transmit the program data of its portion to decoder 16 (S303). Process S304 and process S305 are processed as well as process S302 and process S303. And control unit 11 judges the memory location of the video data with reference to the playback information memorized by playback information table 13 (S306), and control unit 11 judges that the program data of the position where the video data is memorized is played (S307). When control unit 11 judges to play, control unit 11 makes program data memory 14 transmit the program data of its portion to decoder 16 (S308). Decoder 16 which received the program data transmitted from program data memory 14 decodes the program data in the received order (S309).

Thus, also in the case control unit 11 judges the memory location of the video data to be played, it can be played without playback delay.

As mentioned above, when recording the program data of MXF containing the video data in video recording and playback equipment 10, video recording and playback equipment 10 analyzes the position where the video data is memorized in the program data by Key 30 and Length 40 of the MXF file, and memorizes an analysis result on playback information table 13 as the playback information. And playback information table 13 is referred to in the case of the playback, and the memory location of the video data is judged based on the playback information. And video data is extracted from the program data, and the video data is decoded. Thereby, playback of the video data is performed without playback delay.

Since the program data is memorized to video recording and playback equipment 10 with the state of MXF, when transmitting the video data to other video recording and playback equipment 10, it is not necessary to change the video data into MXF, and ease of transmission of MXF and the playback without playback delay can be realized simultaneously.

The present invention is not limited to the above-mentioned composition, and various modification is possible. For example, embodiment 1 and embodiment 2 showed recording and playback of the program data as the separate processes to facilitate the explanation. In the processes shown in embodiment 1 and embodiment 2, the playback is performed after the recording of the program data is completed. However, before finishing of the recording of one program data, the playback may be performed from the portion recorded. Furthermore, the case where the playback of the video data was performed by the command from user interface 15 was shown. However, it may be configured to reserve the playback by specifying the date, time, etc. to play.

In embodiment 1, the playback information and the program data were directly sent to decoder 16 from program data memory 14 and playback information memory 13, respectively. In embodiment 2, the program data was directly sent to decoder 16 from program data memory 14. However, the playback information and the program data may be sent to decoder 16 via the internal bus (not shown) of video recording and playback equipment 10. The playback information may include the compression system name of the video data not only the example indicated in FIG. 3. Furthermore, when the program data includes not only the video but the sound and the title data and they are played, the information that shows the classification of the video, the sound and the title may be added to the playback information.

Furthermore, in embodiment 1, playback information table 13 related and memorized the identification information of the program data and the playback information of each video data about a plurality of program data. However, playback information table 13 may be created for each program data.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. In a video recording and playback equipment which inputs from the outside and records a file of a predetermined file format containing video data and metadata accompanying said video data including information about at least an identification tag to identify said video data and data size of said video data, and which plays said video data, said video recording and playback equipment, comprising:
    a receiver configured to receive said file from the outside;
    an analyzer configured to analyze a memory location of said video data contained in said file received by said receiver with reference to said identification tag to identify said video data and said data size of said video data;
    a playback information table configured to memorize said memory location analyzed by said analyzer as playback information;
    a program data memory configured to memorize said file analyzed by said analyzer without changing said predetermined file format received by said receiver; and
    a decoder configured to judge said memory location of said video data with reference to said playback information, and to play said video data from said file memorized on said program data memory.

2. The video recording and playback equipment according to claim 1, further comprising:
    a control unit configured to make said program data memory transmit said file to said decoder, and to make said playback information table transmit said playback information to said decoder.

3. The video recording and playback equipment according to claim 1, further comprising:
    a control unit configured to read out said file and said playback information and to transmit them to said decoder.

4. In a video recording and playback equipment which inputs from the outside and records a file of a predetermined file format containing video data and metadata accompanying said video data including information about at least an identification tag to identify said video data and data size of said video data, and which plays said video data, said video recording and playback equipment, comprising:

a receiver configured to receive said file from the outside;

an analyzer configured to analyze a memory location of said video data contained in said file received by said receiver with reference to said identification tag to identify said video data and said data size of said video data;

a playback information table configured to memorize said memory location as playback information, a program data memory configured to memorize said file analyzed by said analyzer without changing said predetermined file format received by said receiver;

a control unit configured to judge said memory location of said video data with reference to said playback information, and to read out said video data from said file memorized by said program data memory; and a decoder configured to decode said video data read out by said control unit.

5. The video recording and playback equipment according to claim 1 or 4, wherein said memory location of said video data is expressed by a head position and said data size of said video data in said playback information table.

6. The video recording and playback equipment according to claim 1 or 4, wherein said memory location of said video data is expressed by a head position and an end position of said video data in said playback information table.

7. The video recording and playback equipment according to claim 6, wherein said file is described by a MXF file format of KLV coding method using Key which is said identification tag, Length which shows the information about said data size and Value in which data is stored, and said analyzer judges whether said data is said video data with reference to said Key of said file and analyzes that said head position of said video data judged to be said video data is a starting position of said Value of said file and said end position is a position which is passed by said data size described by said Length of said file.

8. The video recording and playback equipment according to claim 1 or 4, wherein said playback information table is configured to relates said playback information with the identification information of said program data and to memorize them.

9. The video recording and playback equipment according to claim 1 or 4, wherein said predetermined file format is a MXF.

10. In a video recording method which receives from the outside and records a file of a predetermined file format containing video data and metadata accompanying said video data including information about at least an identification tag to identify said video data and data size of side video data, said video recording method, comprising:

receiving said file from the outside;

judging whether said data contained in said file is said video data;

analyzing a memory location where said video data is contained in said file with reference to said identification tag to identify said video data and said data size of said video data when said data is judged to be said video data;

memorizing analyzed said memory location on playback information table as playback information; and memorizing said file received without changing said predetermined file format.

11. The video recording method according to claim 10, wherein said predetermined file format is a MXF.

12. In a video playback method which plays video data from a file which records said video data and metadata accompanying said video data including information about at least an identification tag to identify said video data and data size of said video data by a decoder, said video playback method, comprising:

decoding only said video data contained in said file based on said playback information formed by said video recording method according to claim 10.

13. In a video recording and playback method which receives from the outside and records a file containing a video data and metadata accompanying said video data including information a identification tag to identify said video data and data size of said video data, and plays said video data, said video recording and playback method, comprising:

receiving said file from the outside;

judging whether said data contained in said file is said video data;

analyzing a memory location where said video data is contained in said file with reference to said identification tag to identify said video data and said data size of said video data when said data is judged to be said video data;

memorizing said memory location analyzed on a playback information table as playback information;

memorizing said file received without changing said predetermined file format; and decoding only said video data contained in said file based on said playback information.

* * * * *